US012014157B2

(12) United States Patent
Li et al.

(10) Patent No.: US 12,014,157 B2
(45) Date of Patent: Jun. 18, 2024

(54) INTELLIGENT GENERATION OF CODE FOR IMPUTATION OF MISSING DATA IN A MACHINE LEARNING DATASET

(71) Applicant: FMR LLC, Boston, MA (US)

(72) Inventors: Pu Li, Southborough, MA (US); Pranay Tiwari, Auburndale, MA (US); Manish Worlikar, Flower Mound, TX (US); Alain Wilkinson, Natick, MA (US); Ray Zhang, Winchester, MA (US)

(73) Assignee: FMR LLC, Boston, MA (US)

( * ) Notice: Subject to any disclaimer, the term of this patent is extended or adjusted under 35 U.S.C. 154(b) by 108 days.

(21) Appl. No.: 17/898,815

(22) Filed: Aug. 30, 2022

(65) Prior Publication Data

US 2024/0069874 A1 Feb. 29, 2024

(51) Int. Cl.
*G06F 9/44* (2018.01)
*G06F 8/35* (2018.01)
*G06N 5/01* (2023.01)
*G06N 5/022* (2023.01)

(52) U.S. Cl.
CPC ............ *G06F 8/35* (2013.01); *G06N 5/01* (2023.01); *G06N 5/022* (2013.01)

(58) Field of Classification Search
CPC ............ G06F 8/35; G06N 5/01; G06N 5/022
USPC .................................................. 717/101–109
See application file for complete search history.

(56) References Cited

U.S. PATENT DOCUMENTS

| | | | |
|---|---|---|---|
| 8,843,423 B2 * | 9/2014 | Chu | G06N 5/025 706/45 |
| 9,489,630 B2 * | 11/2016 | Achin | G06N 5/02 |
| 10,409,789 B2 | 9/2019 | Zoll et al. | |
| 10,733,515 B1 | 8/2020 | Mishra et al. | |
| 11,010,365 B2 * | 5/2021 | Lee | G06F 16/285 |
| 11,223,543 B1 | 1/2022 | Fauber et al. | |
| 11,568,187 B2 * | 1/2023 | Huang | G06N 3/045 |
| 2021/0049428 A1 | 2/2021 | Huang et al. | |
| 2022/0076164 A1 * | 3/2022 | Conort | G06N 20/00 |

OTHER PUBLICATIONS

Jea et al., "A Missing Data Imputation Method with Distance Function", 2018, IEEE, pp. 450-455. (Year: 2018).*

(Continued)

*Primary Examiner* — Ted T. Vo
(74) *Attorney, Agent, or Firm* — Cesari & McKenna, LLP

(57) ABSTRACT

Methods and apparatuses are described for intelligent imputation of missing data in a machine learning (ML) dataset comprised of a plurality of features. Each feature includes a plurality of values, where at least a portion of the values for one or more features are missing. A server analyzes the ML dataset to generate characteristics of the missing values in the ML dataset. The server selects an imputation algorithm for filling in the missing values based upon the identified characteristics. The server determines a computing environment in which the imputation algorithm is executed based upon one or more of a size of the ML dataset or the selected algorithm. The server generates code that comprises instructions for executing the imputation algorithm on the ML dataset in the computing environment. The server integrates the code into an ML platform that executes the code to assign replacement values to the missing values.

28 Claims, 12 Drawing Sheets

(56) References Cited

OTHER PUBLICATIONS

Platias et al., "A Comparison of Machine Learning Methods for Data Imputation", 2020, ACM, pp. 150-159. (Year: 2020).*
Choudhury et al., "Missing Data Imputation for Classification Problems", 2020, arXiv, 27 pages. (Year: 2020).*
Pan et al., "Imputation of Missing Values in Time Series Using an Adaptive-Learned Median-Filled Deep Autoencoder", 2022, IEEE, pp. 695-706. (Year: 2022).*
T.D. Pigott, "A Review of Methods for Missing Data," Educational Research and Evaluation, vol. 7, No. 4, 2001, pp. 353-383.
L. Beretta and A. Santaniello, "Nearest neighbor imputation algorithms: a critical evaluation," BMC Medical Informatics and Decision Making 2016, 16(Suppl 3):74, From the 5th Translational Bioinformatics Conference (TBC 2015), Tokyo, Japan. Nov. 7-9, 2015, 12 pages.
D. Stekhoven and P. Buhlmann, "MissForest—non-parametric missing value imputation for mixed-type data," Bioinformatics, vol. 28, Issue 1, Jan. 1, 2012, pp. 112-118.

\* cited by examiner

| | null<5% | null>5% | numeric | classification | normality | mcar |
|---|---|---|---|---|---|---|
| UDI | 0 | 0 | 1 | 1 | 0 | 0 |
| Product ID | 0 | 0 | 0 | 1 | 0 | 0 |
| Type | 0 | 0 | 0 | 1 | 0 | 0 |
| Air temperature [K] | 1 | 0 | 1 | 1 | 1 | 0 |
| Process temperature [K] | 0 | 0 | 1 | 1 | 0 | 0 |
| Rotational speed [rpm] | 0 | 0 | 1 | 1 | 0 | 0 |
| Torque [Nm] | 0 | 0 | 1 | 1 | 1 | 0 |
| Tool wear [min] | 0 | 0 | 1 | 1 | 0 | 0 |
| Machine failure | 0 | 0 | 1 | 1 | 0 | 0 |
| TWF | 0 | 0 | 1 | 1 | 0 | 0 |
| HDF | 0 | 0 | 1 | 1 | 0 | 0 |
| PWF | 0 | 0 | 1 | 1 | 0 | 0 |
| OSF | 0 | 0 | 1 | 1 | 0 | 0 |
| RNF | 0 | 0 | 1 | 1 | 0 | 0 |

FIG. 4A

| Scenario | Time-series | Long-distance | Numeric | Regression as target | <5% missing | Normally-distributed |
|---|---|---|---|---|---|---|
| 1 | 1 | 0 | 1 | 1 | 1 | 1 |
| 2 | 1 | 0 | 1 | 1 | 0 | 1 |
| 3 | 1 | 0 | 1 | 0 | 1 | 1 |
| 4 | 1 | 0 | 1 | 0 | 0 | 1 |
| 5 | 1 | 0 | 0 | 1 | 1 | 1 |
| 6 | 1 | 0 | 0 | 1 | 0 | 1 |
| 7 | 1 | 1 | 1 | 1 | 1 | 1 |
| 8 | 1 | 1 | 1 | 0 | 0 | 1 |
| 9 | 1 | 1 | 1 | 0 | 1 | 1 |
| 10 | 1 | 0 | 1 | 0 | 0 | 1 |
| 11 | 0 | 0 | 1 | 1 | 1 | 1 |
| 12 | 0 | 0 | 1 | 0 | 0 | 1 |
| 13 | 0 | 0 | 0 | 1 | 1 | 1 |
| 14 | 0 | 0 | 0 | 0 | 0 | 1 |
| 15 | 0 | 0 | 0 | 1 | 1 | 1 |
| 16 | 0 | 0 | 1 | 0 | 1 | 1 |
| 17 | 0 | 0 | 0 | 1 | 0 | 1 |
| 18 | 0 | 0 | 0 | 0 | 0 | 1 |
| 19 | 0 | 0 | 1 | 0 | 0 | 0 |
| 20 | 0 | 0 | 1 | 1 | 0 | 0 |

| Scenario | Dataset ID | Training Model | Without-Missing-Value-Baseline-Model Performance | With-Missing-Value-Baseline-Model Performance | With-Imputer-Model Best Performance | Best Imputer |
|---|---|---|---|---|---|---|
| 1 | A | SVR | RMSE: 0.424 | RMSE: 0.439 | RMSE: 0.425 | Iterative_RandomForest |
| 2 | A | SVR | RMSE: 0.424 | RMSE: 0.457 | RMSE: 0.432 | Iterative_RandomForest |
| 3 | B | lightgbm | AUC: 0.984 | AUC: 0.943 | AUC: 0.944 | Iterative_RandomForest |
| 4 | B | Lightgbm | AUC: 0.984 | AUC: 0.951 | AUC: 0.958 | SimpleImputer_mean |
| 5 | A | ExtraTreesRegressor | RMSE: 0.016 | RMSE: 0.016 | RMSE: 0.012 | Any iterative imputer/ KNN imputer |
| 6 | A | ExtraTreesRegressor | RMSE: 0.016 | RMSE: 0.012 | RMSE: 0.012 | Missing values as labels |
| 7 | A | SVR | RMSE: 0.424 | RMSE: 0.429 | RMSE: 0.425 | Iterative_RandomForest |
| 8 | A | SVR | RMSE: 0.424 | RMSE: 0.432 | RMSE: 0.426 | SimpleImputer_mean |
| ... | | | ... | ... | ... | ... |

INTELLIGENT GENERATION OF CODE FOR IMPUTATION OF MISSING DATA IN A MACHINE LEARNING DATASET

TECHNICAL FIELD

This application relates generally to methods and apparatuses, including computer program products, for intelligent generation of code for imputation of missing data in a machine learning dataset.

BACKGROUND

Missing data is a very common and challenging issue in data science and machine learning (ML) projects. Because these types of projects typically require large datasets for training and deployment of advanced machine learning-based models, datasets with missing data values either cannot be used or, if usable, result in trained ML models that have reduced accuracy and robustness for application to various ML problems, such as classification. As can be appreciated, one or more attributes/features in the ML dataset may be missing values, and these missing values can appear differently across samples of data. Discarding samples that have one or more missing values may introduce biases or affect the representativeness of the results. Imputation preserves all cases by replacing missing data with an estimated value based on other available information. There are many different kinds of imputation methodologies, including simple imputation (mean, median, mode); forward fill; interpolation; maximum likelihood; multiple imputation; hot-deck imputation (as described in L. Beretta and A. Santaniello, "Nearest neighbor imputation algorithms: a critical evaluation," *BMC Med. Inform. Decis. Mak.* 2016; 16(Suppl. 3): 74 (Jul. 25, 2016), which includes K-Nearest Neighbor imputation; iterative imputation, which includes MissForest (as described in D. J. Stekhoven et al., "Miss-Forest—non-parametric missing value imputation for mixed-type data," *Bioinformatics*, Vol. 28, Issue 1 (Jan. 1, 2012), pp. 112-118); and neural network-based imputation, among others.

For every machine learning project, data scientists must choose an imputation method or methods for the missing values within each attribute/feature of the dataset. Different datasets have different distributions and may or may not have defined target variables, so finding the best imputation method to serve each unique machine learning modeling goal becomes more challenging. Data scientists often deploy the easiest imputation technique for their projects, but that method can frequently result in biased modeling. Often it is difficult, or even impossible, to implement and experiment with different imputation methods and then evaluate each of them to see which best fits the dataset and the modeling objective. Sometimes, the dataset is too large to use available open-source imputation packages across all the samples. For example, many tables stored in big data infrastructures, such as Snowflake™, are too large to be manipulated in memory, like in Pandas, in a local environment. Meanwhile, most existing imputation methods are dependent on the assumption that the data is missing completely at random (MCAR) or missing at random (MAR). However, in real-world scenarios, the data may be missing not at random.

Currently-available techniques and algorithms attempt to impute missing values in ML datasets. However, these approaches have many limitations. For example, it can be difficult to select an imputation algorithm that is best for a given dataset, due to the vast amount of imputation algorithms available. In addition, existing algorithms are generally not easy to integrate into a current ML project pipeline. For example, these algorithms may be too dependent on local, in-memory based solutions—which limits the usefulness of these algorithms for large datasets that require a significant amount of memory space.

SUMMARY

Therefore, what is needed are methods and systems for intelligent, automated imputation of missing values in ML datasets that cover the whole life cycle of imputation. The techniques described herein advantageously provide for automatic data evaluation for ML datasets, which provides input for an imputer matching engine to identify an imputation algorithm that is best suited for application to the specific ML dataset. In addition, the methods and systems described herein automatically generate source code for execution of the selected imputation algorithm, which can be easily embedded into an existing machine learning production computing pipeline. Furthermore, the systems and methods automatically determine an optimal imputation execution environment, e.g., automatically deciding between an in-memory, SQL, or remote-job based imputation method, as appropriate to satisfy the requirements and/or limitations of the ML dataset and pipeline. As can be appreciated, the methods and systems described herein can be configured as a self-contained, automated system for imputation of missing values. The techniques described herein also have the capability of automatically evaluating the dataset and its missing value distribution, determining an imputation method which can apply to non-MCAR or non-MAR scenarios, automatically selecting the best imputation method, and deploying non-memory-based solutions for large datasets (e.g. SQL in Snowflake™) or a remote job that leverages cloud-based machine learning services (e.g., Sage-Maker™ available from Amazon, Inc.).

The invention, in one aspect, features a computerized method of intelligent generation of code for imputation of missing data in a machine learning dataset comprised of a plurality of features. Each feature includes a plurality of values, where at least a portion of the values for one or more features are missing. A server computing device analyzes the machine learning dataset to generate one or more characteristics of the missing values in the machine learning dataset. The server computing device selects an imputation algorithm for filling in the missing values based upon the identified characteristics of the missing values. The server computing device determines a computing environment in which the imputation algorithm is executed based upon one or more of a size of the machine learning dataset or the selected imputation algorithm. The server computing device generates code that comprises instructions for executing the imputation algorithm on the machine learning data set in the computing environment. The server computing device integrates the code into a machine learning platform that executes the code to assign replacement values to each of the missing values in the machine learning dataset.

The invention, in another aspect, features a computer system for intelligent generation of code for imputation of missing data in a machine learning dataset comprised of a plurality of features, where each feature includes a plurality of values and at least a portion of the values for one or more features are missing. The system includes a server computing device comprising a memory for storing computer-executable instructions and a process that executes the computer-executable instructions. The server computing device analyzes the machine learning dataset to generate one or more characteristics of the missing values in the machine learning dataset. The server computing device selects an imputation algorithm for filling in the missing values based upon the identified characteristics of the missing values. The server computing device determines a computing environment in which the imputation algorithm is executed based upon one or more of a size of the machine learning dataset or the selected imputation algorithm. The server computing device generates code that comprises instructions for executing the imputation algorithm on the machine learning data set in the computing environment. The server computing device integrates the code into a machine learning platform that executes the code to assign replacement values to each of the missing values in the machine learning dataset.

Any of the above aspects can include one or more of the following features. In some embodiments, the server computing device receives the machine learning dataset from a remote computing device. In some embodiments, receiving the machine learning dataset comprises receiving one or more files comprising the machine learning dataset from the remote computing device, receiving an identification of a location where the machine learning dataset is stored from the remote computing device, or both.

In some embodiments, analyzing the machine learning dataset to generate one or more characteristics of the missing values in the machine learning dataset comprises determining a missing value distribution for the machine learning dataset, and generating an output matrix based upon the missing value distribution. In some embodiments, determining a missing value distribution comprises (i) evaluating percentages of the missing values for each feature; (ii) determining whether the values for each feature are normally distributed; (iii) determining whether the missing values for each feature are missing at random; (iv) determining whether each feature with missing values is numeric or categorical; and (v) determining whether the machine learning dataset is associated with a classification problem or a regression problem. In some embodiments, when the machine learning dataset comprises time series data, determining a missing value distribution further comprises (vi) determining whether a difference between a first existing value in the dataset and the next existing value in the dataset is greater than a predefined threshold. In some embodiments, the output matrix comprises, for each feature in the machine learning dataset, a vector of binary values corresponding to elements (i) to (vi).

In some embodiments, selecting an imputation algorithm for filling in the missing values based upon the identified characteristics of the missing values comprises matching at least one vector in the output matrix to an imputation algorithm. In some embodiments, matching at least one vector in the output matrix to an imputation algorithm comprises traversing a decision tree using the binary values of at least one vector in the output matrix to identify the imputation algorithm. In some embodiments, traversing a decision tree using the binary values of at least one vector in the output matrix to identify the imputation algorithm comprises traversing a first decision tree for each feature with missing values that is numeric and traversing a second decision tree for each feature with missing values that is categorical.

In some embodiments, determining a computing environment in which the imputation algorithm is executed comprises selecting a memory-based computing environment when the size of the machine learning dataset is at or below a threshold size, and selecting a non-memory-based computing environment when the size of the machine learning dataset is above the threshold size. In some embodiments, the non-memory-based computing environment comprises a cloud-based computing environment. In some embodiments, generating code that comprises instructions for executing the imputation algorithm on the machine learning data set in the computing environment comprises receiving indicia of an output file format from a user of the server computing device, and generating the code into an output file that conforms to the output file format. In some embodiments, integrating the code into a machine learning platform comprises transmitting the output file comprising the code to the machine learning platform, and inserting the output file into a machine learning data processing pipeline at the machine learning platform.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4A is a diagram of an exemplary output matrix generated by the dataset analysis module.

FIG. 5 is a diagram of an exemplary scenario grid used to test imputation algorithm performance.

FIG. 6 is a chart of exemplary outcomes from some experiments performed to determine the optimal imputation algorithm for a given scenario and reference ML dataset.

DETAILED DESCRIPTION

Figure 1:
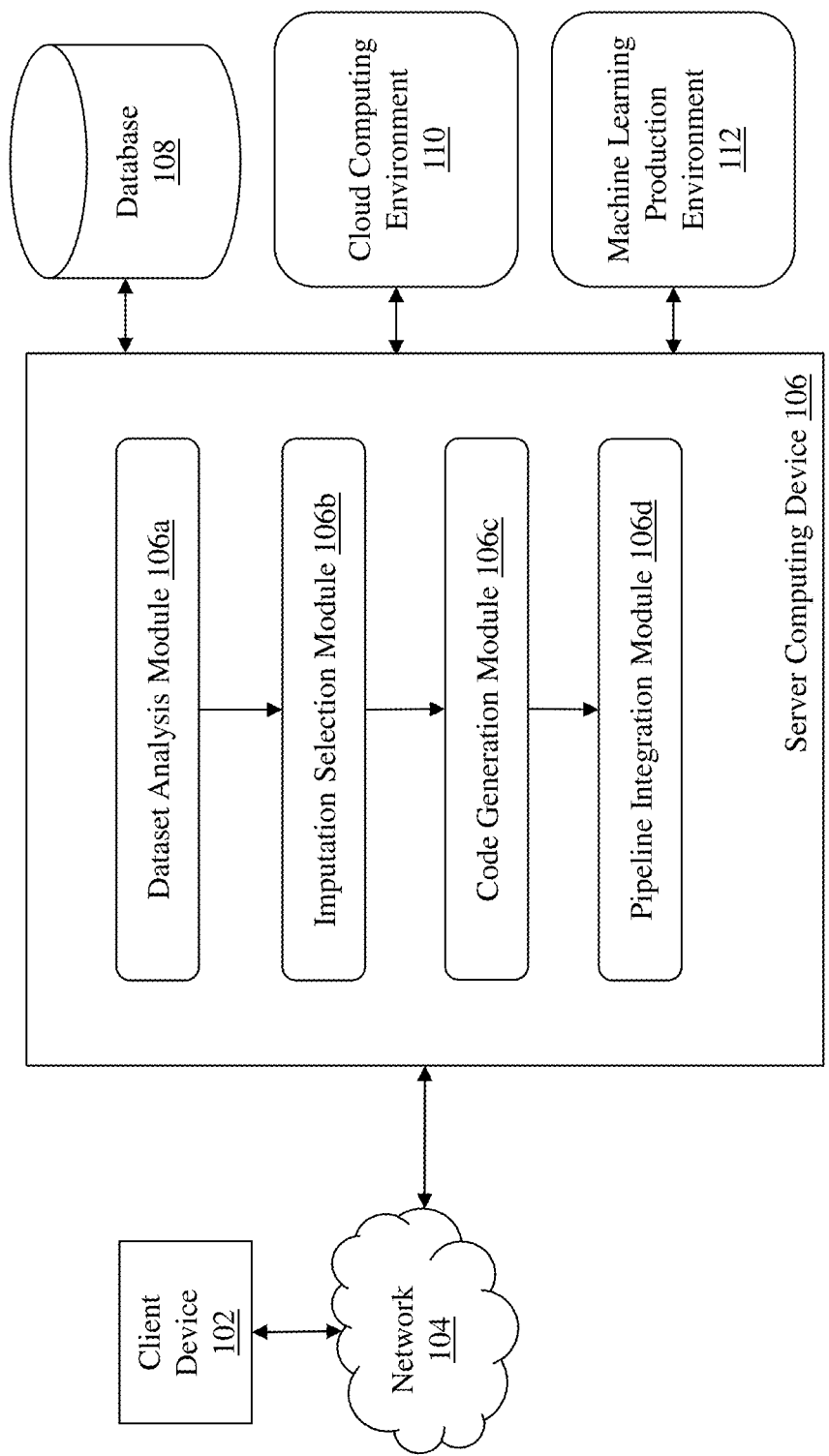
FIG. 1 is a block diagram of a system for intelligent generation of code for imputation of missing data in a machine learning dataset.

FIG. 1 is a block diagram of a system 100 for intelligent generation of code for imputation of missing data in a machine learning dataset. System 100 includes client computing device 102, communication network 104, server computing device 106 that includes dataset analysis module 106a, imputation selection module 106b, code generation module 106c, and pipeline integration module 106d. System 100 further comprises database 108, cloud computing environment 110, and machine learning (ML) production environment 112.

Client computing device 102 connects to communication network 104 in order to communicate with server computing device 106 to provide input and receive output relating to the process of intelligent generation of code for imputation of missing data in a machine learning dataset as described herein. In some embodiments, client computing device 102 is coupled to a display device (not shown). For example, client computing device 102 can provide a graphical user interface (GUI) via the display device that presents output resulting from the methods and systems described herein, where a user of client computing device 102 interacts with the user interface to request functionality, provide data input and commands, and the like for the purpose of intelligent generation of code for imputation of missing data in a machine learning dataset as described herein. Exemplary client computing devices include but are not limited to desktop computers, laptop computers, tablets, mobile devices, smartphones, and internet appliances. It should be appreciated that other types of computing devices that are capable of connecting to the components of system 100 can be used without departing from the scope of invention. Although FIG. 1 depicts a single client computing device 102, it should be appreciated that system 100 can include any number of client computing devices.

Communication network 104 enables client computing device 102 to communicate with server computing device 106. Network 104 is typically a wide area network, such as the Internet and/or a cellular network. In some embodiments, network 104 is comprised of several discrete networks and/or sub-networks (e.g., cellular to Internet). Also, in some embodiments, one or more of database 108, cloud computing environment 110, and ML production environment 112 are coupled to network 104 for the purpose of communicating with client computing device 102 and/or server computing device 106.

Server computing device 106 is a device including specialized hardware and/or software modules that execute on a processor and interact with memory modules of server computing device 106, to receive data from other components of system 100, transmit data to other components of system 100, and perform functions for intelligent generation of code for imputation of missing data in a machine learning dataset as described herein. Server computing device 106 includes dataset analysis module 106a, imputation selection module 106b, code generation module 106c, and pipeline integration module 106d that execute on one or more processors of server computing device 106. In some embodiments, modules 106a-106d are specialized sets of computer software instructions programmed onto one or more dedicated processors in server computing device 106 and can include specifically-designated memory locations and/or registers for executing the specialized computer software instructions.

Although modules 106a-106d are shown in FIG. 1 as executing within the same server computing device 106, in some embodiments the functionality of modules 106a-106d can be distributed among a plurality of server computing devices. As shown in FIG. 1, server computing device 106 enables modules 106a-106d to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 106a-106d is described in detail throughout the specification.

Database 108 is located on a computing device (or in some embodiments, on a set of computing devices) coupled to server computing device 106. Database 108 is configured to receive, generate, and store specific segments of data relating to the process of intelligent generation of code for imputation of missing data in a machine learning dataset as described herein. In some embodiments, all or a portion of database 108 can be integrated with server computing device 106 (e.g., in one or more memory locations local to server computing device 106) or be located on a separate computing device or devices. Database 108 can comprise one or more databases configured to store portions of data used by other components of system 100 as will be described in greater detail below.

Cloud computing environment 110 comprises one or more computing devices coupled to server computing device 106 that provide remote, distributed, on-demand computer system resources—such as data storage, processing and other technology infrastructure—that can be used by server computing device 106 and/or client computing device 102 for a variety of purposes, including but not limited to executing functionality and managing data associated with intelligent generation of code for imputation of missing data in a machine learning dataset as described herein. Exemplary cloud computing environments that can be utilized by server computing device 106 and/or client computing device include, but are not limited to, Amazon® AWS™, Microsoft® Azure™, Snowflake™ data warehouse, and others.

Machine learning production environment 112 comprises one or more computing devices coupled to server computing device 106 that host a production computing environment for the execution of one or more machine learning processing pipelines (e.g., ML model training and deployment for use in data science applications). For example, a machine learning processing pipeline may comprise one or more classification models, neural networks, and/or other ML computing structures, platforms, frameworks, or algorithms that receive an ML dataset as input. Typically, such pipelines are based upon programmatic code that, when executed, processes the input ML dataset to perform a variety of different actions (e.g., model training and re-training, data analysis, prediction, etc.). Exemplary machine learning frameworks and algorithms can include, but are not limited to, nearest neighbor, logistic regression, ridge regression, Random Forest, extra trees, ensemble voting classification, stacked classification, gradient boosting on decision trees (e.g., CatBoost available from catboost.ai, LightGBM available from Microsoft Corp., XGBoost available from xgboost.ai), feed forward neural networks (e.g., multilayer perceptron (MLP)), and others.

Figure 2:
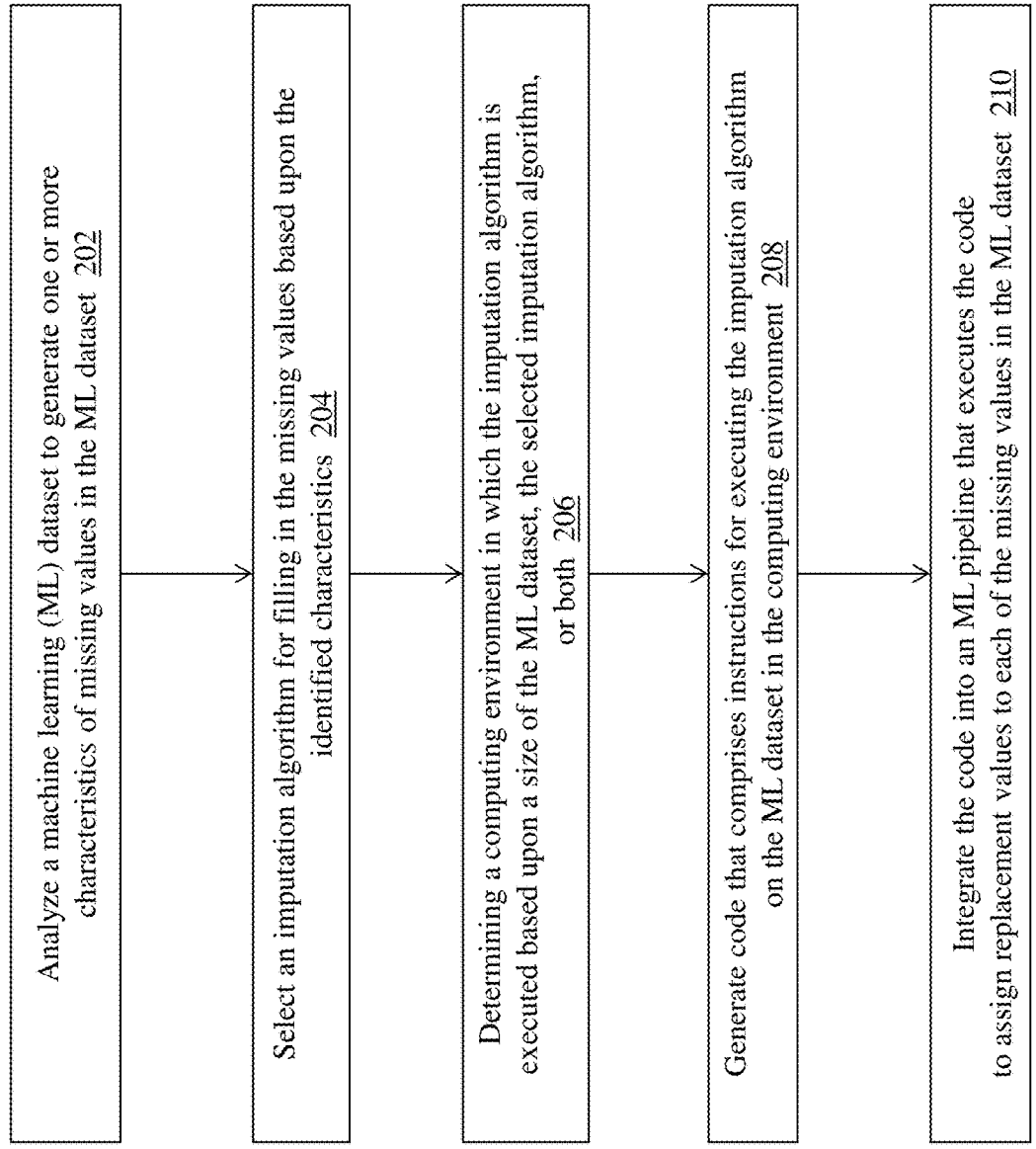
FIG. 2 is a flow diagram of a computerized method of intelligent generation of code for imputation of missing data in a machine learning dataset.

FIG. 2 is a flow diagram of a computerized method 200 of intelligent generation of code for imputation of missing data in a machine learning dataset, using system 100 of FIG. 1. As mentioned above, a ML dataset typically comprises a plurality of different features, where each feature represents a measurable piece of data that can be used for analysis. Each feature is composed of a plurality of different values. For ease of illustration, an exemplary ML dataset can comprise a matrix where each column in the matrix is a feature and each row in the matrix is a data instance made up of values for each feature—as shown in Table 1 below:

TABLE 1

| UserID | Age | Job Role | Salary |
|---|---|---|---|
| 1 | 24 | Technician | $75,000 |
| 2 | 51 | Manager | $107,000 |
| 3 | 33 | Administrator | $144,000 |
| ... | ... | ... | ... |

As can be appreciated, one or more of the values for a given feature or features in a data instance may be missing from the ML dataset. In this context, a value can be considered missing if it is null, blank, zero, empty, or another designation (e.g., N/A) that indicates no value is provided. In order to ensure that the ML dataset is usable for model training, execution, analysis, etc. by ML production pipeline, the missing values must be filled in with replacement values generated using an imputation algorithm.

Dataset analysis module 106a of server computing device 106 receives a machine learning (ML) dataset and analyzes (step 202) the received ML dataset to generate one or more characteristics of missing values in the ML dataset. In some embodiments, module 106a receives one or more files comprising the ML dataset from, e.g., client computing device 102, database 108, and/or cloud environment 110. In one example, a user at client computing device 102 can upload one or more files comprising the ML dataset to module 106a. In other embodiments, module 106a receives an identification of a location where the ML dataset is stored. For example, a user at client computing device 102 can provide an address (e.g., URL), a pointer, a file folder or directory, or other indicia to module 106a that identifies a storage location for the ML dataset. In some embodiments, module 106a retrieves the ML dataset from the identified location and stores the ML dataset locally (e.g., in database 108). In other embodiments, module 106a accesses the ML dataset using the identified location without retrieving the entire ML dataset.

Figure 3:
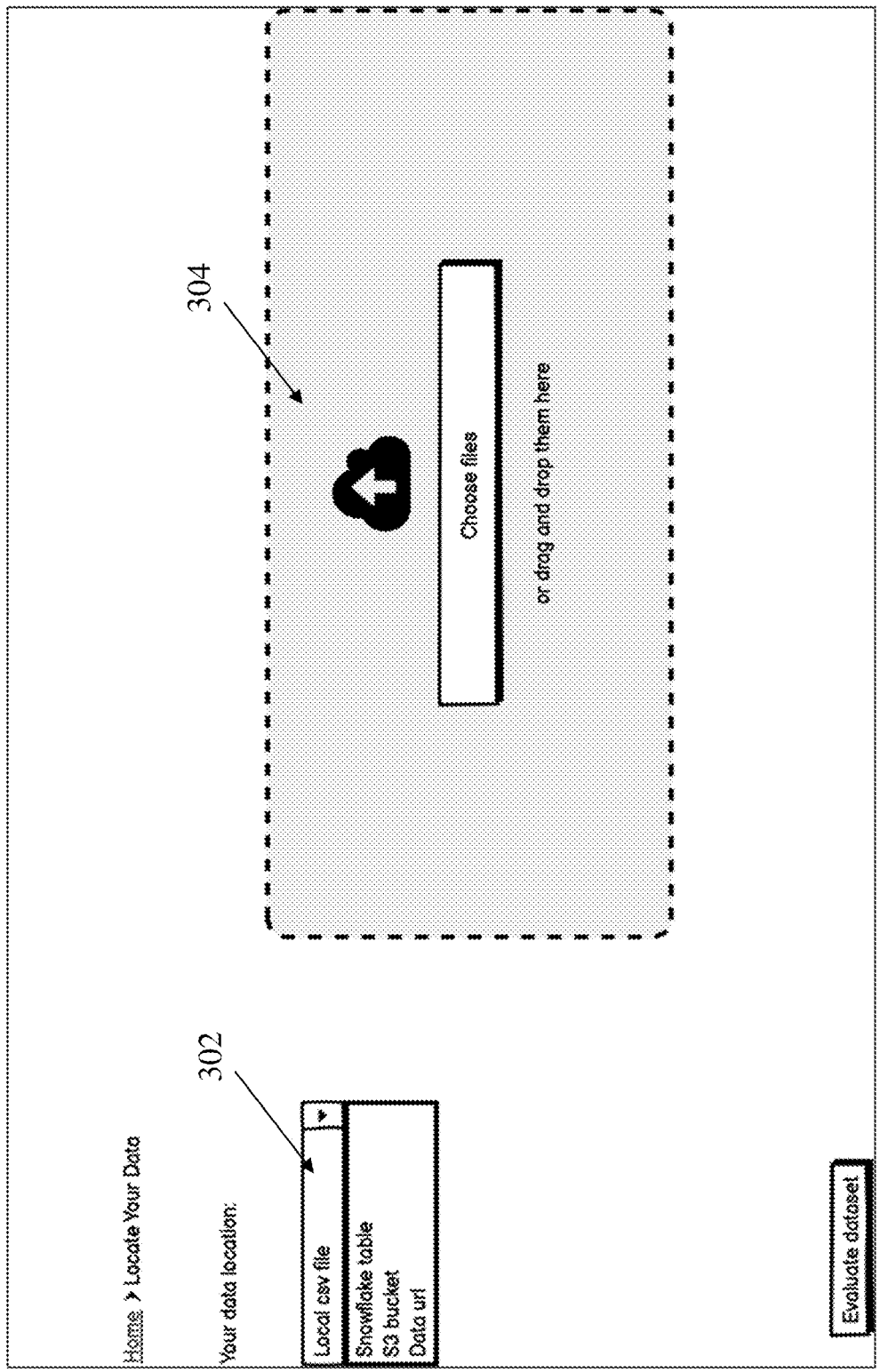
FIG. 3 is a diagram of an exemplary user interface for display on a client computing device that enables a user to identify a location for an ML data set to be analyzed.

FIG. 3 is a diagram of an exemplary user interface 300 for display on client computing device 102 that enables a user to identify a location for an ML data set to be analyzed. User interface 300 includes drop down menu 302 with several different options for selection by the user, e.g., local .csv file, Snowflake table, S3 bucket, or data URL. As shown in FIG. 3, a user has selected 'local csv file' in menu 302 and user interface 300 displays input element 304 that instructs the user to choose (or drag and drop) files (e.g., .csv files) that comprise the dataset. As can be appreciated, when the user selects a different option in menu 302, user interface 300 dynamically adapts to display another input element depending upon the selected option—e.g., the 'data URL' option can result in an input text box displayed in element 304 that enables the user to enter an HTTP address or other type of URL that corresponds to a location of the dataset for access and/or retrieval by module 106a.

Turning back to FIG. 2, once the ML dataset is identified/selected, dataset analysis module 106a analyzes (step 202) the ML dataset to generate one or more characteristics of the missing values for each feature in the ML dataset. Module 106a traverses the ML dataset to (i) locate missing values in one or more features and (ii) identify a plurality of characteristics of the missing values in each feature. Module 106a identifies characteristics of the ML dataset feature's missing value distribution—including a) evaluating missing value percentages (i.e., what percentage of the values for a feature are missing), b) identifying if the feature is normally distributed, c) recognizing if data is missing at complete random (MCAR), d) discerning if the feature(s) with missing values should be treated as numeric (e.g., measurements) or categorical (i.e., data type that can be identified via names or labels), and e) deciding if the dataset is a classification or regression problem. Additionally, for time series data, module 106a can evaluate f) whether the missing data for a feature has a long distance gap—e.g., for a missing value at time step t, if the difference between the value at time step t-n (the last time step before t with a non-missing value) and the value at time step t+m (the first time step after t with a non-missing value) is greater than a certain threshold, then module 106a flags the missing value as a long distance missing value.

Figure 4B:
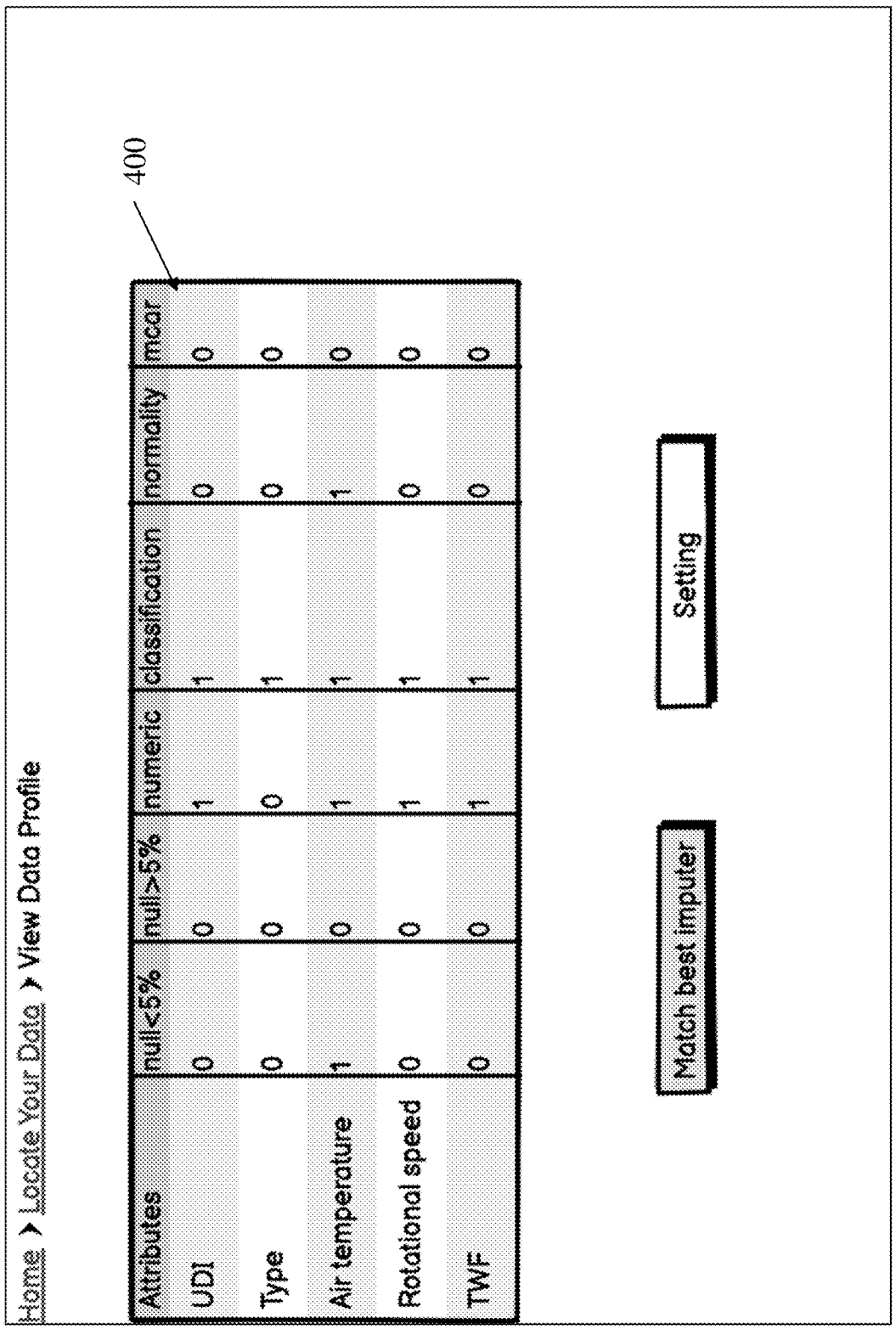
FIG. 4B is a diagram of an exemplary user interface that displays the output matrix of FIG. 4A to a user of a client computing device.
Figure 4C:
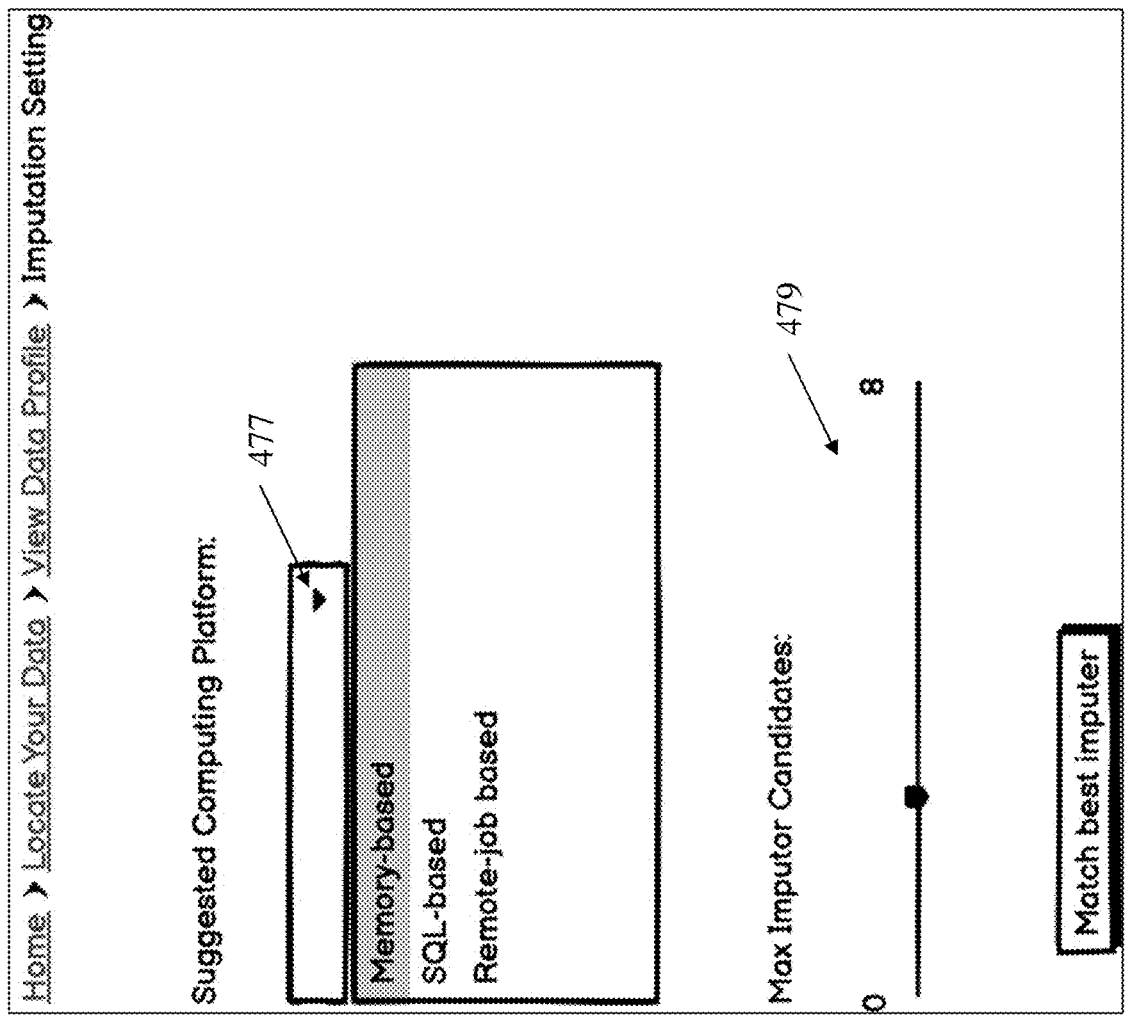
FIG. 4C is a diagram of an exemplary user interface for customization of imputation settings.

Module 106a converts the identified characteristics into an output matrix comprised of a plurality of vectors, each representing the missing value characteristics for a different feature of the ML dataset. FIG. 4A is a diagram of an exemplary output matrix generated by module 106a. As shown in FIG. 4A, the features 402 of the dataset (UDI, Product ID, Type, . . . ) are placed in the leftmost column, with each of the remaining columns 404 corresponding to one of the missing value characteristics described above (null<5%, null>5%, numeric, classification, normality, MCAR). Each row of the output matrix is comprised of a vector of binary values for each feature, where 0 indicates the feature's values do not satisfy the characteristic and 1 indicates the feature's values do satisfy the characteristic. For example, the "Air temperature [K]" feature 406 has a vector of [1, 0, 1, 1, 1, 0]—which means that i) less than 5% of the feature's values are null, ii) greater than 5% of the feature's values are not null, iii) the feature is a numeric feature, iv) the dataset is a classification problem, v) the missing values of the feature are normally distributed, and vi) the missing values of the feature are not missing completely at random. FIG. 4B is a diagram of an exemplary user interface 450 that displays output matrix 400 of FIG. 4A to a user of client computing device 102. As shown in FIG. 4B, user interface 450 also comprises a match button 452 that executes the functionality of imputation selection module 106b (as described below) and a setting button 454, which enables a user of client computing device 102 to adjust aspects of the imputation selection according to desired parameters. FIG. 4C is a diagram of an exemplary user interface 475 for customization of imputation settings. As shown in FIG. 4C, user interface 475 includes a computing platform drop down menu 477 and a maximum imputer candidates slider 479. Via menu 477, the user can select from a number of different computing platforms that can execute the imputation of missing values into the ML dataset (e.g., memory-based, SQL-based, remote job-based).

As can be appreciated, certain imputation algorithms and/or ML datasets may require a certain level of computing power and/or memory resources in order to execute. In order to select the optimal imputation algorithm and generate the correct code for executing the imputation routine, the user of client computing device 102 can select which type of computing environment on which the imputation algorithm should run. In some embodiments, dataset analysis module 106a can automatically determine a computing environment for executing the imputation algorithm based upon, e.g., the selected imputation algorithm and/or the ML dataset (see step 206 of FIG. 2 described below).

Slider 479 enables a user of client computing device 102 to limit the number of imputation algorithms that are chosen as candidates for performing the imputation for the ML dataset. In some embodiments, the user may want to see only, e.g., the top-n imputation algorithms based upon performance and slider 479 enables the user to customize this value.

Once the output matrix is created by module 106a after evaluation of an ML dataset as described above, imputation selection module 106b receives the output matrix and selects (step 204) an imputation algorithm for filling in the missing values for each feature based upon the identified characteristics. It should be appreciated that, in certain circumstances, different imputation algorithms can be selected for different features of a given ML dataset because the missing value characteristics for the features are best suited for application of different imputation approaches. Imputation selection module 106b is configured to utilize a decision tree algorithm when deciding which imputation algorithm is best suited for a given ML dataset and/or specific feature(s) within a dataset. Before describing the flow of decision tree algorithm that selects the imputation algorithm (see FIG. 8 below), it is beneficial to describe how the form of the decision tree algorithm was determined using experimental data.

In generating the form of the decision tree algorithm, first a plurality of main scenarios were identified as defined by the missing value characteristics of a potential input ML dataset. FIG. 5 is a diagram of an exemplary scenario grid used to test imputation algorithm performance. Each scenario corresponds to a vector of binary values for the missing value characteristics. As can be appreciated, each scenario represents a different combination of missing value characteristics for potential input ML datasets.

Next, a plurality of well-known reference ML datasets were selected, where one or more of the reference ML datasets have characteristics that correspond to one or more of the scenarios in the scenario grid of FIG. 5. Importantly, each of the reference ML datasets do not have any missing values. Exemplary reference ML datasets are shown in Table 2 below:

TABLE 2

| Dataset ID | Dataset Name | Summary | Available from |
| --- | --- | --- | --- |
| A | Bike sharing dataset | Times series, regression | www.kaggle.com/lakshmi25npathi/bike-sharing-dataset |
| B | Predictive maintenance | Times series, classification with numerical and categorical features | www.kaggle.com/tolgadincer/predictive-maintenance/code |
| C | Multiple stations bike sharing dataset | Times series, group level, regression | www.kaggle.com/akkithetechie/new-york-city-bike-share-dataset |
| D | Multiple stations bike sharing dataset | Times series, group level, classification | www.kaggle.com/akkithetechie/new-york-city-bike-share-dataset |
| E | HR attrition dataset | Non-times series, classification | www.kaggle.com/pavansubhasht/ibm-hr-analytics-attrition-dataset |
| F | Real estate dataset | Non-time series, regression, with numeric and categorical features | www.kaggle.com/c/house-prices-advanced-regression-techniques/data |
| G | Telecom churn dataset | Non-times series, classification | www.kaggle.com/mnassrib/telecom-churn-datasets |

Then, a machine learning model was trained on each of the above-referenced reference ML datasets that do not have any missing values to generate a baseline model for each reference ML dataset (the "Without-Missing-Value-Baseline-Model"), and performance of the model was determined by, e.g., analyzing indicators such as root mean square error (RMSE), mean square error (MSE), area under the curve (AUC), F1 score, etc. for the model. Next, the values in some columns for each reference ML dataset were replaced with null or zero values using the missing value characteristics for each scenario in the scenario grid as a guide—and another ML model was trained on each modified reference ML dataset (the "With-Missing-Value-Baseline-Model"), and performance of the model was determined (using metrics such as those noted above).

Then, a plurality of different imputation algorithms were selected and implemented on the modified reference ML datasets. An exemplary list of imputation algorithms that were used during testing are set forth in Table 3 below:

TABLE 3

| Imputer | Available from |
| --- | --- |
| SimpleImputer_mean | scikit-learn.org/stable/modules/generated/sklearn.impute.SimpleImputer.html |
| SimpleImputer_median | scikit-learn.org/stable/modules/generated/sklearn.impute.SimpleImputer.html |
| SimpleImputer_most_frequent | scikit-learn.org/stable/modules/generated/sklearn.impute.SimpleImputer.html |
| KNNImputer | machinelearningmastery.com/knn-imputation-for-missing-values-in-machine-learning/ |
| Iterative_RandomForest | scikit-learn.org/stable/auto_examples/impute/plot_iterative_imputer_variants_comparison.html#sphx-glr-auto-examples-impute-plot-iterative-imputer-variants-comparison-py |
| Iterative_BayesianRidge | scikit-learn.org/stable/auto_examples/impute/plot_iterative_imputer_variants_comparison.html#sphx-glr-auto-examples-impute-plot-iterative-imputer-variants-comparison-py |
| Iterative_DecisionTree | scikit-learn.org/stable/auto_examples/impute/plot_iterative_imputer_variants_comparison.html#sphx-glr-auto-examples-impute-plot-iterative-imputer-variants-comparison-py |
| Iterative_ExtraTree | scikit-learn.org/stable/auto_examples/impute/plot_iterative_imputer_variants_comparison.html#sphx-glr-auto-examples-impute-plot-iterative-imputer-variants-comparison-py |
| Iterative_KNN | scikit-learn.org/stable/modules/impute.html#iterative-imputer |
| Interpolate | pandas.pydata.org/docs/reference/api/pandas.DataFrame.interpolate.html |
| Ffill | www.geeksforgeeks.org/python-pandas-dataframe-ffill |

Each imputation algorithm was applied to each modified reference ML dataset to insert replacement values for the missing values, train a new ML model (the "With-Imputer-Model") using the imputed ML dataset, and determine the performance for the new ML model (using metrics such as those noted above). In this way, the imputation algorithm having the optimal performance for a given scenario of missing values was identified. FIG. 6 is a chart of exemplary outcomes from some experiments performed to determine the optimal imputation algorithm for a given scenario and reference ML dataset.

Figure 7:
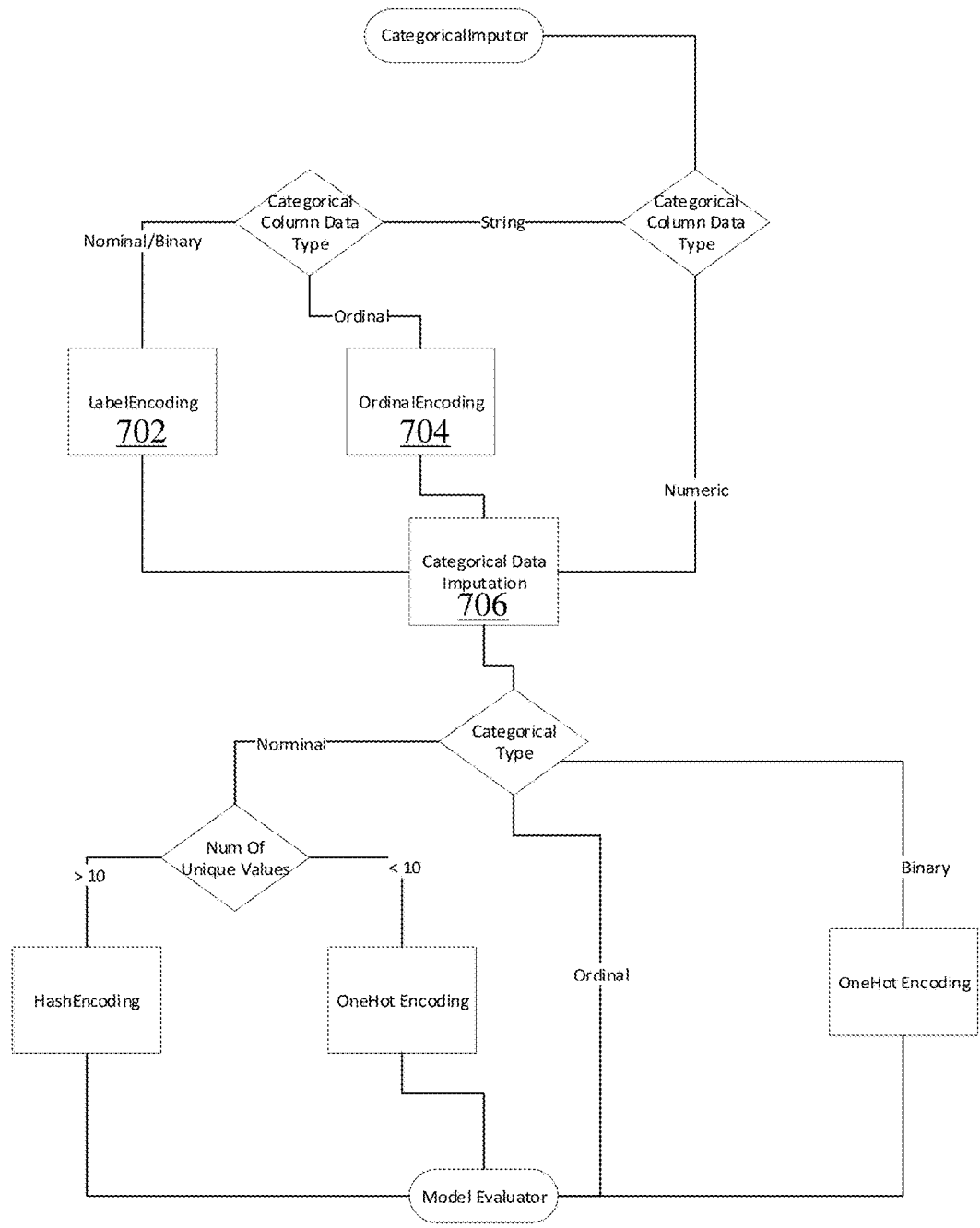
FIG. 7 is a flow diagram of an exemplary algorithm executed by the imputation selection module to impute values for ML datasets that have missing categorical values.

In some embodiments, imputation selection module 106*b* executes an algorithm for ML datasets that have categorical missing features. FIG. 7 is a flow diagram of an exemplary algorithm 700 executed by imputation selection module 106*b* to impute values for ML datasets that have missing categorical values. As shown in FIG. 7, depending upon the data type of a categorical feature, module 106*b* can encode the features differently for imputation and model evaluation. For example, module 106*b* applies label encoding (702) for nominal/binary features that are of type string and applies ordinal encoding (704) for ordinal columns that are of type string. Then, module 106*b* applies a data imputation algorithm (706) to impute the missing values.

To prepare the imputed dataset for model evaluation, module 106*b* applies one-hot encoding (708) for binary and nominal columns (where distinct values <17) and applies hash encoding (710) for nominal columns (where distinct values >17). Then, module 106*b* uses the encoded dataset as input to generate the ML models (described above) for evaluation. In some embodiments, to handle unseen classes in the dataset, input can be augmented to include 'unknown' for column type 'string', max(classes)+1 for column type 'integer'.

Figure 8:
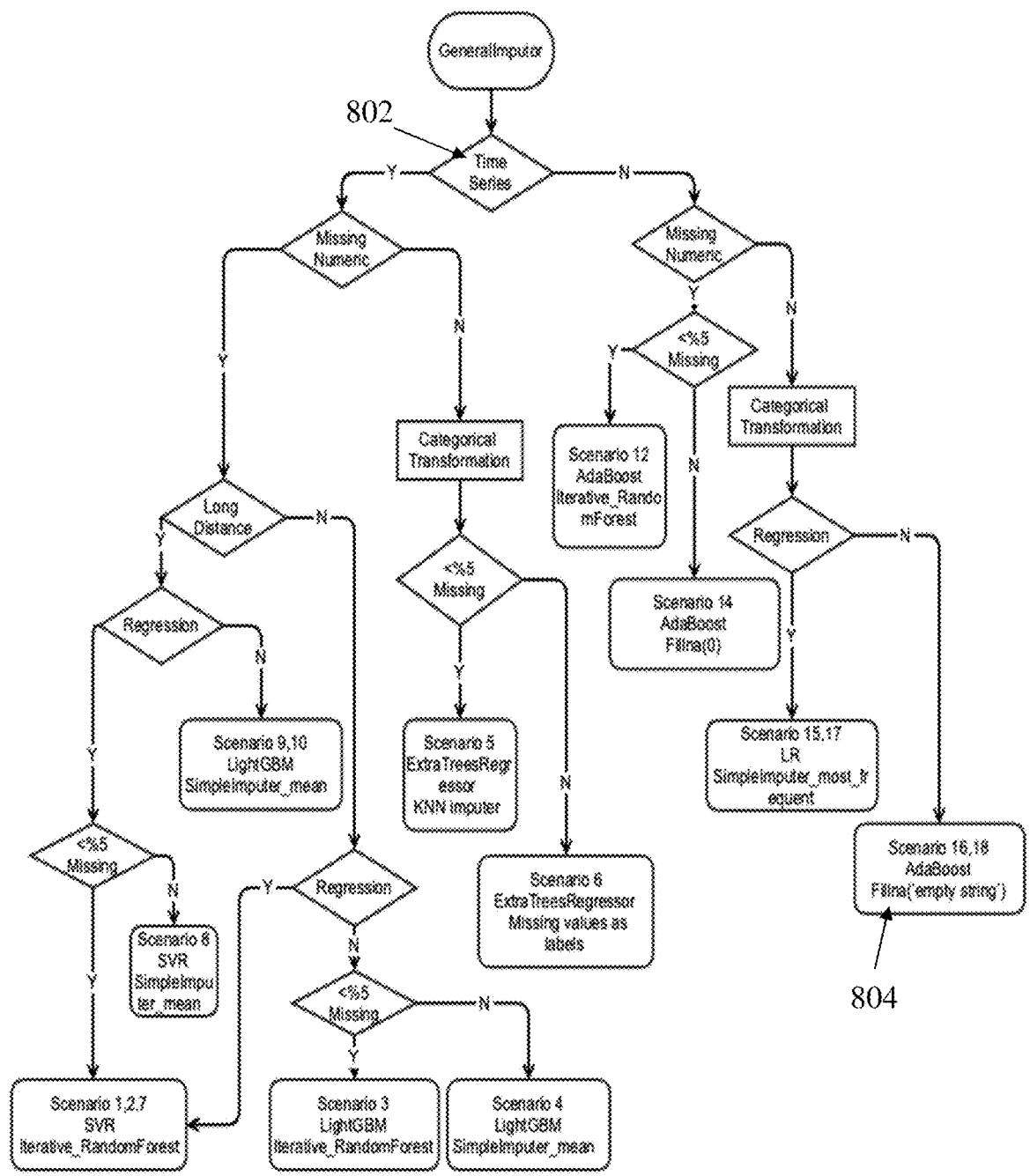
FIG. 8 is a flow diagram of an exemplary decision tree algorithm traversed by the imputation selection module for selection of an imputation algorithm.

Using the outcomes from the dataset experiments as described above, a decision tree algorithm was generated and implemented for use by imputation selection module 106*b* for selecting an optimal imputation algorithm for a particular ML dataset that has certain missing value characteristics. FIG. 8 is a flow diagram of an exemplary decision tree algorithm 800 traversed by imputation selection module 106*b* for selection of an imputation algorithm. As shown in FIG. 8, the decision tree 800 comprises a series of decision points that are evaluated against the output matrix for an ML dataset that is missing values to identify an optimal imputation algorithm. As can be appreciated, the binary values for each missing value characteristic of the input ML dataset are evaluated by module 106*b* using the decision tree. As an example, if the ML dataset comprises time series data, module 106*b* traverses decision point 802 ("Time Series") and moves to the left ("Y"), whereas if the ML dataset does not comprise time series data, module 106*b* traverses decision point 802 and moves to the right ("N"). It should be appreciated that module 106*b* continues traversing the decision tree algorithm based upon other elements of the missing values for the ML dataset until reaching an end node (or leaf node) (e.g., node 804) that identifies an optimal imputation algorithm.

In some embodiments, imputation selection module 106*b* can be configured to traverse the decision tree algorithm 800 for a plurality of potential missing value scenarios (such as those described in FIG. 5) and determine an optimal imputation algorithm for each of the potential missing value scenarios. The results of this process can be stored in a mapping table or vector space (e.g., in database 108) that correlates the scenario (and its characteristics) with the selected imputation algorithm. Then, when a new ML dataset with missing values is received, module 106*b* can utilize a nearest neighbor algorithm or similar distance metric-based algorithm to identify one of the potential missing value scenarios that has characteristics which are closest to the characteristics of the new ML dataset, and use the mapping table/vector space to select the imputation algorithm that is mapped to the closest scenario.

Figure 9:
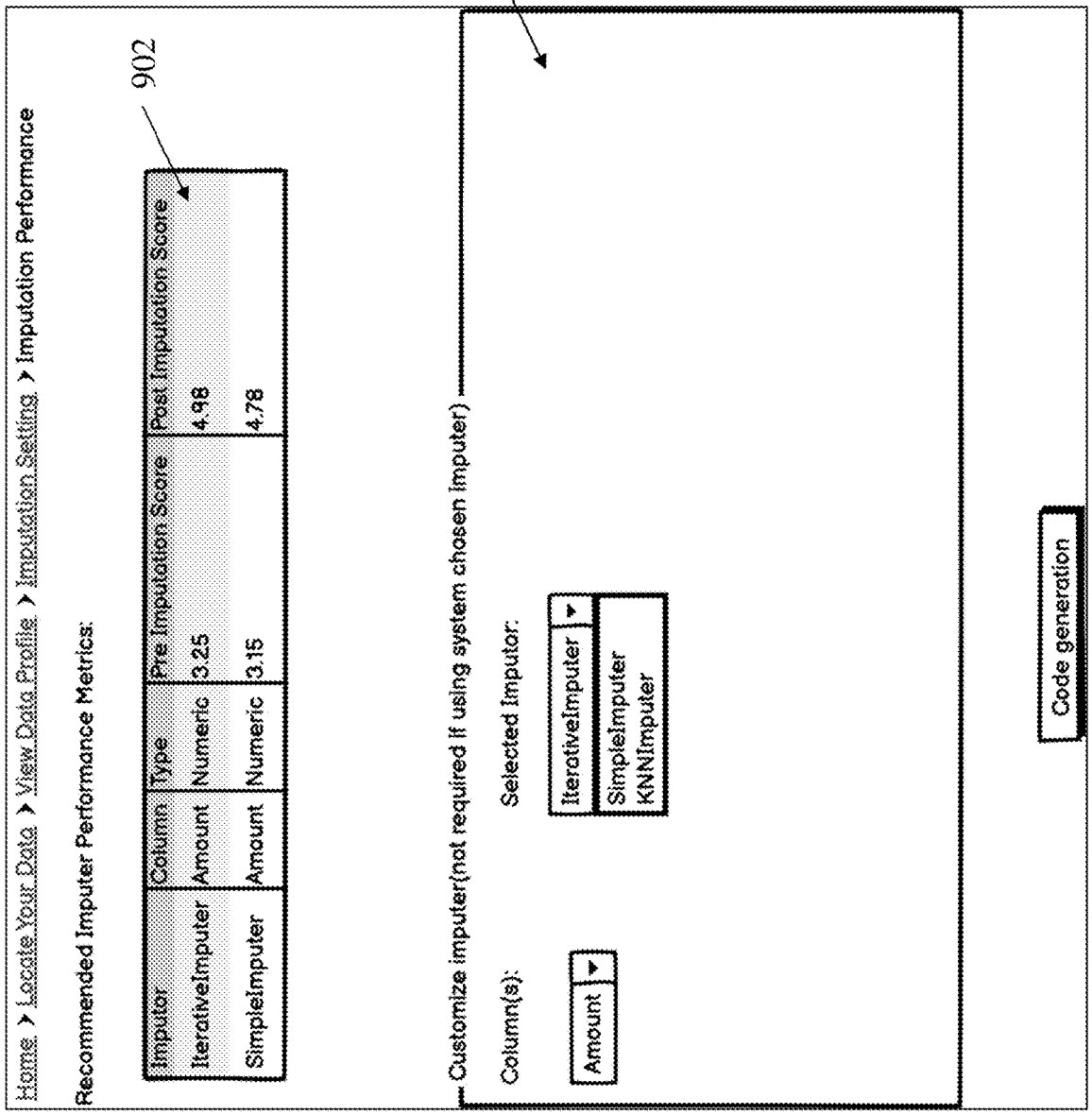
FIG. 9 is a diagram of an exemplary user interface that shows imputation algorithms selected by the imputation selection module using the decision tree.

FIG. 9 is a diagram of an exemplary user interface 900 that shows imputation algorithms selected by imputation selection module 106*b* using the decision tree. As shown in FIG. 9, user interface 900 includes a table 902 that lists one or more selected imputation algorithms along with relevant information (e.g., performance metrics) for the associated imputer. In the example of FIG. 9, table 902 lists two imputation algorithms (IterativeImputer and SimpleImputer) that, when applied to missing values in the Amount column of the dataset, provide for the corresponding improvements in imputation score. Based upon this information, the user can select an imputation algorithm to use in generating code for execution of the imputation algorithm, as will be described below. In some embodiments, user interface 900 can include a customization area 904 that enables the user to manually select a specific imputation algorithm to use on a given column or feature of the ML dataset (instead of the imputation algorithm(s) automatically selected by module 106*b*).

As mentioned previously, once one or more imputation algorithms are identified for given feature(s) of an ML dataset, code generation module 106*c* of server computing device 106 determines (step 206 of FIG. 2) a computing environment in which the imputation algorithm is executed based upon a size of the ML dataset, the selected imputation algorithm, or both. For example, it may be impossible or impracticable to execute the imputation algorithm(s) locally on server computing device 102 due to the size of the ML dataset (i.e., large datasets with many features may require significant memory resources) and/or the specific imputation algorithms (i.e., certain algorithms may require a minimum level of processing power or bandwidth that server computing device 200 cannot provide). Advantageously, code generation module 106*c* can determine a computing environment that is capable of executing the imputation algorithm(s) efficiently and quickly. For example, module 106*c* can determine that, for ML datasets over a certain size threshold, a SQL-based computing environment (e.g., Snowflake™) should be selected while for other ML datasets over another, larger size threshold, a remote job-based computing environment (e.g., SageMaker™) should be selected. Also, it should be appreciated that in some cases, the ML dataset can be small enough to enable execution of the imputation algorithm locally on server computing device 200. Similarly, some imputation algorithms may require specific processing routines that are best executed on a computing platform with minimum processor hardware or capabilities. Code generation module 106*c* can determine an optimal computing environment for these imputation algorithms (e.g., more complex or processing-intensive algorithms can be executed in a remote job, while simpler algorithms can be executed locally on server computing device 200, and so forth).

Figure 10:
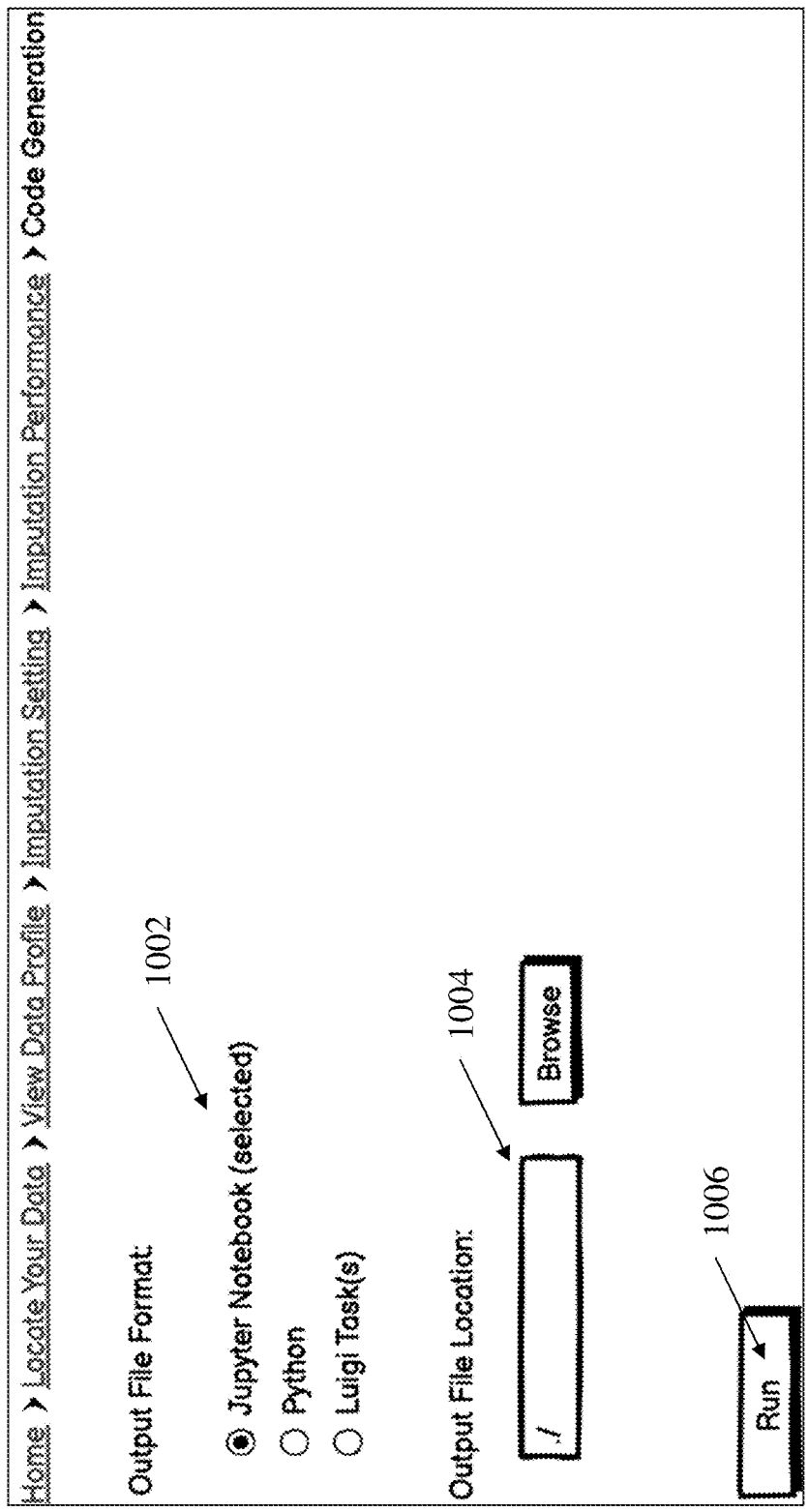
FIG. 10 is a diagram of an exemplary user interface for selection of code generation output parameters.

After the computing environment is determined, code generation module 106*c* generates (step 208 of FIG. 2) code that comprises instructions for executing the imputation algorithm on the ML dataset in the computing environment. As part of the code generation process, a user at client computing device 102 can select a desired code file format and output file location for the code. FIG. 10 is a diagram of an exemplary user interface 1000 for selection of code generation output parameters. As shown in FIG. 10, user interface 1000 includes a file format selector 1002 that enables a user at client computing device 102 to choose a specific code file format (e.g., Jupyter Notebook, Python, Luigi Task(s)) for the imputation algorithm processing code and an input box 1004 for the user to enter or select a directory location where the code file will be written by module 106c. When the parameters have been selected, the user can interact with run button 1006 to instruct module 106c to generate the corresponding code.

In some embodiments, code generation module 106c can automatically generate the code file(s) for the imputation algorithm execution and write the code file(s) to a predetermined location—such as a directory in the ML production environment 112, a location in database 108, etc. Consequently, pipeline integration module 106c detects the generation of the code file(s) and integrates (step 210 of FIG. 2) the code into an ML pipeline in environment 112 that executes the code to assign replacement values to each of the missing values in the ML dataset. For example, pipeline integration module 106c can retrieve the code file(s) from the storage location and establish a communication session with one or more production computing devices in ML production environment 112 that manage a ML processing pipeline that is used to train and execute specific ML models and frameworks (such as classification models, neural networks, and the like) that execute data operations using the ML datasets. Using the code file(s), pipeline integration module 106c can modify one or more processing workflows or application modules associated with the ML pipeline to initiate execution of the imputation algorithms (via the code file(s)) during pipeline processing so that the missing values for the input ML dataset are filled in—to result in ML models trained and executed on the pipeline that are more robust, accurate, and less susceptible to errors caused by missing data.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of intelligent generation of code for imputation of missing data in a machine learning dataset comprised of a plurality of features, each feature including a plurality of values, wherein at least a portion of the values for one or more features are missing, the method comprising:
    analyzing, by a server computing device, the machine learning dataset to generate one or more characteristics of the missing values in the machine learning dataset;
    selecting, by the server computing device, an imputation algorithm for filling in the missing values based upon the identified characteristics of the missing values;
    determining, by the server computing device, a computing environment in which the imputation algorithm is executed based upon one or more of a size of the machine learning dataset or the selected imputation algorithm;
    generating, by the server computing device, code that comprises instructions for executing the imputation algorithm on the machine learning data set in the computing environment; and
    integrating, by the server computing device, the code into a machine learning platform that executes the code to assign replacement values to each of the missing values in the machine learning dataset.

2. The method of claim 1, further comprising receiving a machine learning dataset from a remote computing device.

3. The method of claim 2, wherein receiving a machine learning dataset from a remote computing device comprises receiving one or more files comprising the machine learning dataset from the remote computing device, receiving an identification of a location where the machine learning dataset is stored from the remote computing device, or both.

4. The method of claim 1, wherein analyzing the machine learning dataset to generate one or more characteristics of the missing values in the machine learning dataset comprises:
    determining a missing value distribution for the machine learning dataset; and
    generating an output matrix based upon the missing value distribution.

5. The method of claim 4, wherein determining a missing value distribution comprises (i) evaluating percentages of the missing values for each feature; (ii) determining whether the values for each feature are normally distributed; (iii) determining whether the missing values for each feature are missing at random; (iv) determining whether each feature with missing values is numeric or categorical; and (v) determining whether the machine learning dataset is associated with a classification problem or a regression problem.

6. The method of claim 5, wherein when the machine learning dataset comprises time series data, determining a missing value distribution further comprises (vi) determining whether a difference between a first existing value in the dataset and the next existing value in the dataset is greater than a predefined threshold.

7. The method of claim 6, wherein the output matrix comprises, for each feature in the machine learning dataset, a vector of binary values corresponding to elements (i) to (vi).

8. The method of claim 7, wherein selecting an imputation algorithm for filling in the missing values based upon the identified characteristics of the missing values comprises matching at least one vector in the output matrix to an imputation algorithm.

9. The method of claim 8, wherein matching at least one vector in the output matrix to an imputation algorithm comprises traversing a decision tree using the binary values from at least one vector in the output matrix to identify the imputation algorithm.

10. The method of claim 9, wherein traversing a decision tree using the binary values from at least one vector in the output matrix to identify the imputation algorithm comprises traversing a first decision tree for each feature with missing values that is numeric and traversing a second decision tree for each feature with missing values that is categorical.

11. The method of claim 1, wherein determining a computing environment in which the imputation algorithm is executed comprises:

selecting a memory-based computing environment when the size of the machine learning dataset is at or below a threshold size; and selecting a non-memory-based computing environment when the size of the machine learning dataset is above the threshold size.

12. The method of claim 11, wherein the non-memory-based computing environment comprises a cloud-based computing environment.

13. The method of claim 1, wherein generating code that comprises instructions for executing the imputation algorithm on the machine learning data set in the computing environment comprises:

receiving indicia of an output file format from a user of the server computing device; and generating the code into an output file that conforms to the output file format.

14. The method of claim 13, wherein integrating the code into a machine learning platform comprises:

transmitting the output file comprising the code to the machine learning platform; and inserting the output file into a machine learning data processing pipeline at the machine learning platform.

15. A system for intelligent generation of code for imputation of missing data in a machine learning dataset comprised of a plurality of features, each feature including a plurality of values, wherein at least a portion of the values for one or more features are missing, the system comprising:

a server computing device that:

analyzes the machine learning dataset to generate one or more characteristics of the missing values in the machine learning dataset;

selects an imputation algorithm for filling in the missing values based upon the identified characteristics of the missing values;

determines a computing environment in which the imputation algorithm is executed based upon one or more of a size of the machine learning dataset or the selected imputation algorithm;

generates code that comprises instructions for executing the imputation algorithm on the machine learning data set in the computing environment; and integrates the code into a machine learning platform; and a machine learning platform that executes the code to assign replacement values to each of the missing values in the machine learning dataset.

16. The system of claim 15, wherein the server computing device receives the machine learning dataset from a remote computing device.

17. The system of claim 15, wherein receiving the machine learning dataset comprises receiving one or more files comprising the machine learning dataset from the remote computing device, receiving an identification of a location where the machine learning dataset is stored from the remote computing device, or both.

18. The system of claim 15, wherein analyzing the machine learning dataset to generate one or more characteristics of the missing values in the machine learning dataset comprises:

determining a missing value distribution for the machine learning dataset; and generating an output matrix based upon the missing value distribution.

19. The system of claim 18, wherein determining a missing value distribution comprises (i) evaluating percentages of the missing values for each feature; (ii) determining whether the values for each feature are normally distributed; (iii) determining whether the missing values for each feature are missing at random; (iv) determining whether each feature with missing values is numeric or categorical; and (v) determining whether the machine learning dataset is associated with a classification problem or a regression problem.

20. The system of claim 19, wherein when the machine learning dataset comprises time series data, determining a missing value distribution further comprises (vi) determining whether a difference between a first existing value in the dataset and the next existing value in the dataset is greater than a predefined threshold.

21. The system of claim 20, wherein the output matrix comprises, for each feature in the machine learning dataset, a vector of binary values corresponding to elements (i) to (vi).

22. The system of claim 21, wherein selecting an imputation algorithm for filling in the missing values based upon the identified characteristics of the missing values comprises matching at least one vector in the output matrix to an imputation algorithm.

23. The system of claim 22, wherein matching at least one vector in the output matrix to an imputation algorithm comprises traversing a decision tree using the binary values from at least one vector in the output matrix to identify the imputation algorithm.

24. The system of claim 23, wherein traversing a decision tree using the binary values from at least one vector in the output matrix to identify the imputation algorithm comprises traversing a first decision tree for each feature with missing values that is numeric and traversing a second decision tree for each feature with missing values that is categorical.

25. The system of claim 15, wherein determining a computing environment in which the imputation algorithm is executed comprises:

selecting a memory-based computing environment when the size of the machine learning dataset is at or below a threshold size; and selecting a non-memory-based computing environment when the size of the machine learning dataset is above the threshold size.

26. The system of claim 25, wherein the non-memory-based computing environment comprises a cloud-based computing environment.

27. The system of claim 15, wherein generating code that comprises instructions for executing the imputation algorithm on the machine learning data set in the computing environment comprises:

receiving indicia of an output file format from a user of the server computing device; and generating the code into an output file that conforms to the output file format.

28. The system of claim 27, wherein integrating the code into a machine learning platform comprises:

transmitting the output file comprising the code to the machine learning platform; and inserting the output file into a machine learning data processing pipeline at the machine learning platform.

* * * * *